May 3, 1949. H. M. RICHARDSON 2,469,342
METHOD AND APPARATUS FOR MOLDING PLASTICS
Filed Aug. 24, 1945 2 Sheets-Sheet 1
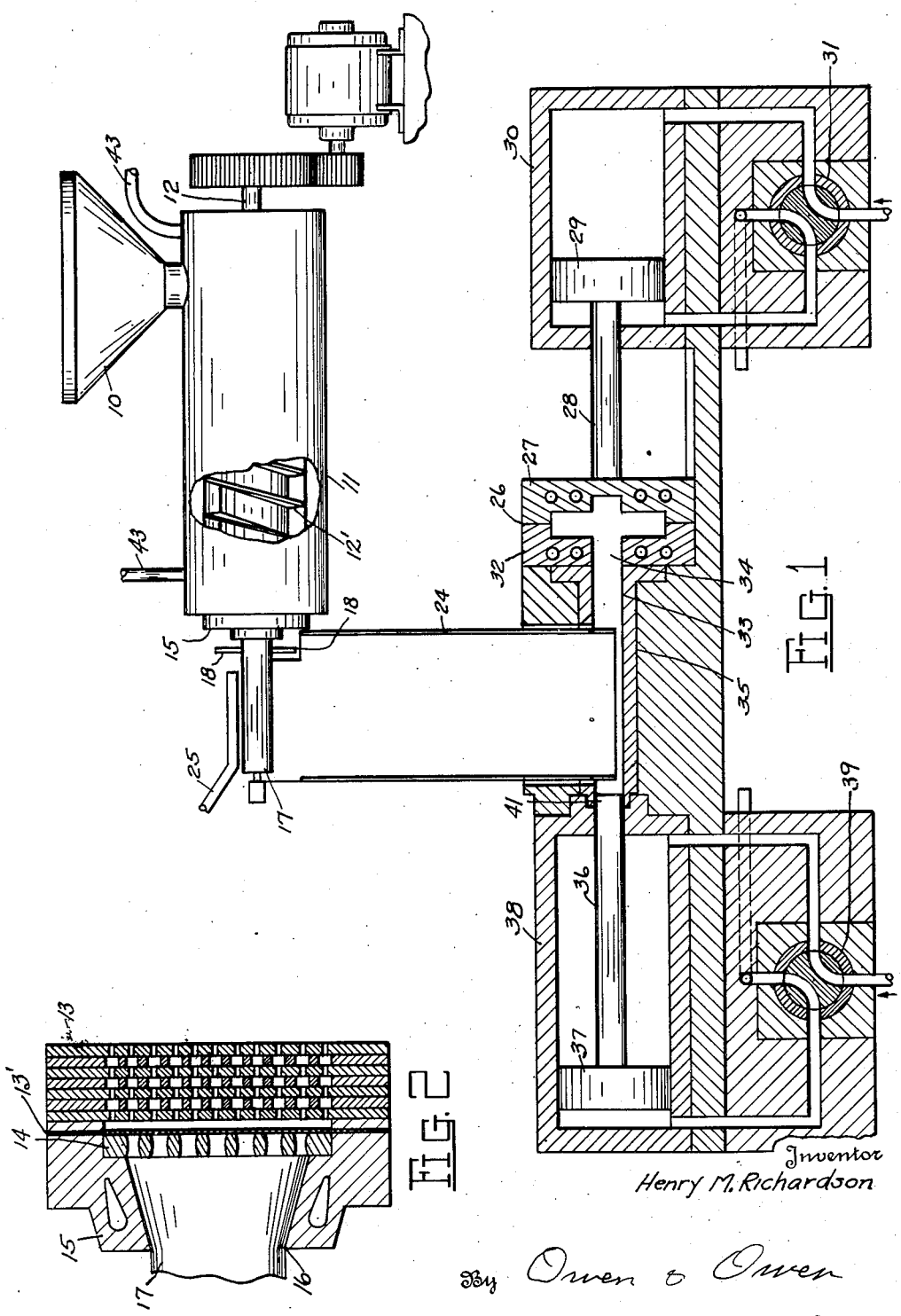
Inventor
Henry M. Richardson
By Owen & Owen
Attorneys May 3, 1949.  H. M. RICHARDSON  2,469,342
METHOD AND APPARATUS FOR MOLDING PLASTICS
Filed Aug. 24, 1945  2 Sheets-Sheet 2
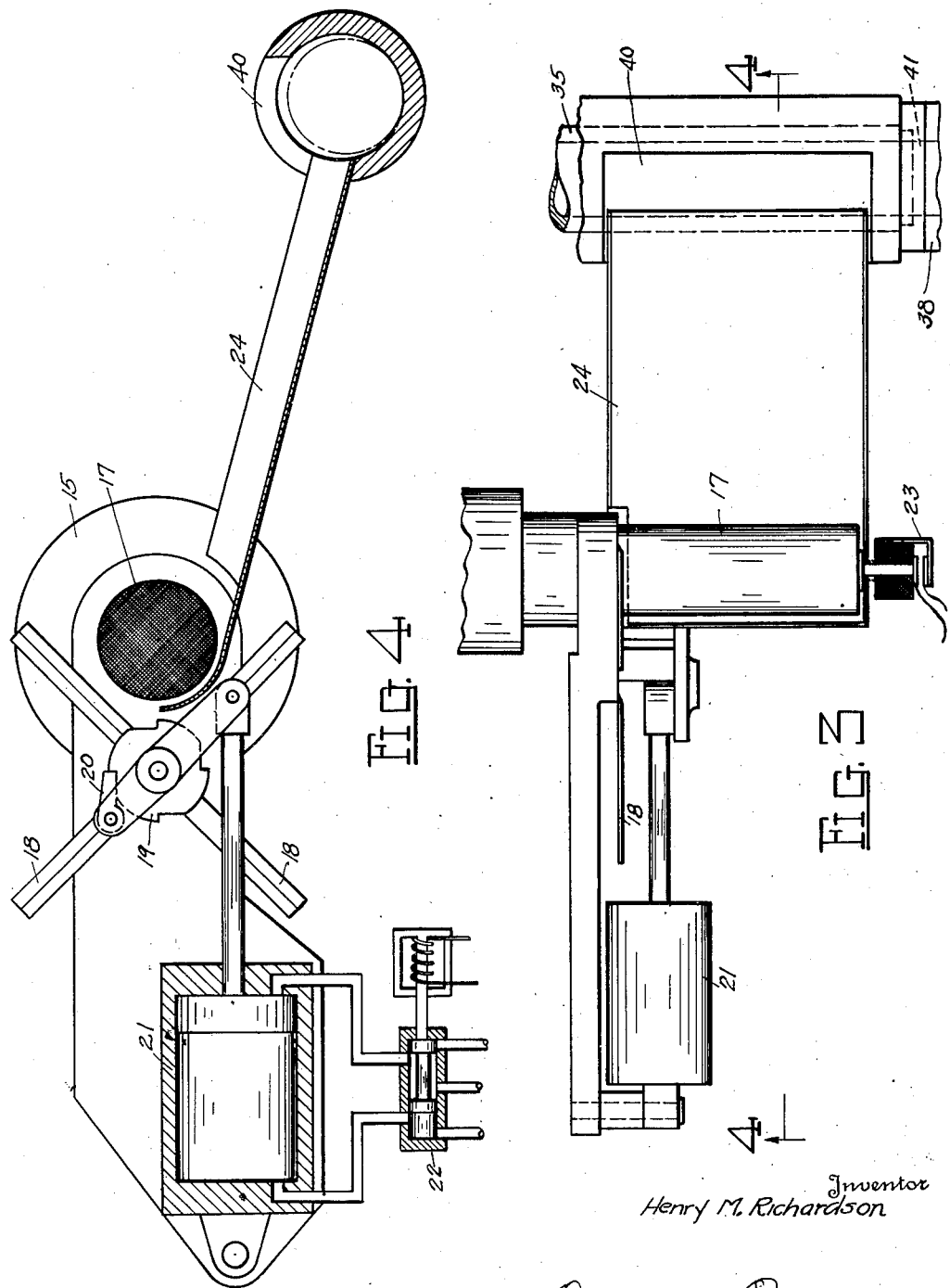
Inventor
Henry M. Richardson
By Owen & Owen
Attorneys Patented May 3, 1949

2,469,342

UNITED STATES PATENT OFFICE 2,469,342

METHOD AND APPARATUS FOR MOLDING PLASTICS

Henry M. Richardson, Springfield, Mass., assignor, by direct and mesne assignments, of one-half to The Grotelite Company, Inc., Bellevue, Ky., a corporation of Kentucky, and one-half to Lima-Hamilton Corporation, Hamilton, Ohio, a corporation of Virginia Application August 24, 1945, Serial No. 612,405

5 Claims. (Cl. 18—30)

This invention relates to molding plastics and is intended primarily for molding thermoplastics. More particularly, it relates to preparing successive charges of plastics and forcing those charges into molds to form the desired articles.

It has for an object to mold thermoplastics at a minimum forming temperature in order to require the least possible cooling to set condition, and to thereby minimize the molding time and the shrinkage resulting from cooling.

Another object is to provide mold charges of approximately uniform temperature and composition throughout and minimize differential shrinkage upon molding.

Another object is to provide a method and apparatus whereby articles of comparatively large size may be formed quickly and with a maximum of uniformity.

Another object is to contiuously heat and extrude plastic material while intermittently transferring and pressing into molds successive charges of as large size as desired.

Another object is to start with ingredients for forming a thermoplastic material, continuously mix and heat the ingredients into a plastic material, and form the material into articles without allowing it to set betwen mixing and molding.

Other objects of the invention and minor features will appear as the description proceeds.

In the accompanying drawings forming a part of this specification, Figure 1 is a diagrammatic view of apparatus suitable for carrying out the invention.

Fig. 2 is an enlarged section of the discharge end of the extruder.

Fig. 3 is a plan view of transfer apparatus.

Fig. 4 is a view of the cut-off and transfer mechanism, approximately on the line 4—4 of Fig. 3.

In the form of apparatus indicated in the drawings, there is a hopper 10 for receiving the materials to be treated. These materials are forced through a channel 11 by means of a screw 12' driven by shaft 12. Beyond the screw there is indicated a stack of breaker plates 13 (see Fig. 2) which consists of a series of breaker plates which preferably have holes therethrough of different sizes. Each plate may have large holes and small holes alternating both circumferentially and radially. The small holes are in line with large holes in the adjacent plate whereby the total cross-section of the holes in successive plates is approximately the same, but the flow through successive large and small holes is such as to produce a thorough mixing of the material as it passes therethrough. Beyond the stack of breaker plates, there is another breaker plate 14 which supports a screen pack 13' through which the plasticated material must be forced. The nozzle 15 through which the material passes after being forced through the breaker plate is preferably restricted somewhat at the opening 16. The total cross-section of the exit opening 16 need not be smaller than the total cross-section of the openings through the last breaker plate 14.

Beyond the openings 16, the material forms a column 17. As will be more fully explained later, the apparatus is intended to operate so that the material as it is discharged will be stiffly plastic and will maintain columnar form. That is, it will be substantially self-sustaining, or shape-retaining when at rest or during careful handling, while still readily deformable under pressure.

There is provided a cut-off device for severing the column into lengths, slugs or charges after a sufficient amount has been extruded. The particular form of the cut-off device may be varied greatly, but for purposes of illustration there is shown a cutting wheel provided with a series of blades 18. The cutter is driven by a ratchet wheel 19 engaged by a pawl 20, which is operated by a cylinder 21 controlled by a valve 22. The valve is operated by a limit switch 23 which placed in the path of the column and may be adjusted to operate when the desired length of column has been extruded.

After the slug or mold charge has been cut off from the end of the extruded column, it is transferred to an injection molding device. This transfer may take place in various ways, but a very simple way is indicated in the drawings where a chute 24 is provided down which the slug or mold charge may roll. The chute will be kept at the proper temperature to have the desired effect upon the exterior of the mold charge or slug. If desired, nozzles 25 may be provided for directing gases against the surface of the slug after it is extruded. Ordinarily these gases will be somewhat cooler than the temperature of the extruded plastic, but above atmospheric temperature.

The injection molding apparatus in the form shown in the drawings comprises a two-part mold which is shown as being divided upon a vertical line 26. On the right of this dividing line there is a mold half 27 mounted upon the piston rod 28 attached to a piston 29 in a cylinder 30 controlled by a valve 31. The other half 32 of the mold normally abuts the end of the injection cylinder 33. The mold half 32 has an opening 34 therein which is preferably of the same size as the effective cross-section of the injection cylinder. The effective size of the cylinder is dependent upon the lining 35 of that cylinder. A plunger 36 driven by a piston 37 in a cylinder 38 controlled by valve 39 is arranged in line with the injection cylinder, and an opening 40 is provided in the upper side of the rear end of the injection cylinder so that the slug or mold charge may roll down the chute and enter the cylinder at this point.

Where desired, different nozzles 15 may be provided with openings 16 of different sizes, and these may be selected to produce a slug or mold charge slightly smaller in diameter than the opening 34 in mold 32 and sleeve 35. In the form illustrated, it is presumed that the mold part 32 and sleeve 35 have the minimum sized opening therein, and if a larger diameter of opening should be employed, rings may be attached to the end 41 of plunger 36.

The operation of the apparatus may be readily understood from the foregoing description, but for convenience will be summarized as follows:

The material which is to be molded is introduced in powdered or granular form into the hopper 10 and is masticated and plasticated by the extruding apparatus. The channel 11 is preferably kept at a controlled temperature by any suitable means. In the drawings there are indicated pipes 43 for supplying suitable temperature controlling fluid to the jacket around channel 11. The mechanical force employed in mixing and masticating the material imparts heat thereto and this may be approximately equal to, or more or less than, the heat required to raise the temperature of the material sufficiently to make it plastic. The heat control through pipes 43 will adjust the temperature in any case so that, as the material is extruded, it will be substantially uniformly of a temperature such as to make it stiffly plastic. It should be in a condition to remain in a column or slug that will substantially maintain its shape and size but still is sufficiently plastic to be shaped under pressure to the shape of the mold cavity.

It is preferable to extrude the material continuously, as this results in the maximum uniformity of temperature and plastication. Since a slug of relatively large cross-section is desired, the opening 16 is large. It may be necessary to obstruct outlet 16 temporarily to allow the plastic material issuing from breaker plate 14 to consolidate in a column filling opening 16, but once started the column continues solid even with opening 16 larger in cross-section than the total of the holes in the breaker plate.

Any material which may be mixed and heated to such a stiffly plastic condition may be employed. The process and apparatus are intended primarily for thermoplastic materials, but might be used under certain conditions for thermosetting plastics also. If employed for thermosetting plastics, the type of plastic employed should preferably have a softening point well below the temperature at which it will set quickly, in order to avoid danger of setting of the material before it is forced into the mold. With such material, the injection cylinder and/or mold may be provided with suitable heating means for raising the temperature of the material to setting point.

The most commonly employed process for molding thermo-plastic material at the present time is to prepare the material in granular form and feed it to the entrance end of an injection cylinder through which it is driven by a reciprocating plunger. The material is heated and plasticated as it passes through the cylinder. The material at the entrance end of the cylinder is cool, and is kept in solid form so that it will not stick to the plunger or to the walls of the cylinder where the plunger reciprocates therein. The material, being heated during its passage through the injection cylinder, is of increasing temperature as it approaches the discharge nozzle through which it passes into the mold. In order to have sufficient material sufficiently plastic to conform under pressure to the mold cavity and fill it, the material at the nozzle is quite fluid, and in order to avoid dribbling, the nozzle opening is small in cross-section. When the material is discharged into the mold, the last of the material to enter the mold has not been in contact with the heated walls of the injection cylinder as long as that material which first enters the mold and, consequently, there is a serious difference in the temperature of different portions of the material entering the mold, and the material first to enter the mold is hotter than is necessary for shaping. The friction of the solid material at the entrance end of the injection cylinder, and the force required for mixing and plasticating the material as it passes through the cylinder, requires very heavy pressure by the plunger. This pressure is much greater than that necessary to force plastic material into the mold.

It will be noted that the apparatus shown is arranged to have the end of the slug which was extruded first contact the injection plunger, while the end extruded last enters the mold first. This is ordinarily preferable, since the slug usually cools after extrusion so that any difference in the temperature of the two ends favors the contact of the plunger with the cool end to which it is less likely to stick. The cooling of the surface of the slug forms a surface skin that helps to avoid sticking.

Ordinary types of thermoplastic material have a considerable coefficient of heat expansion, and their expansion is greater when in the plastic stage than in a solid stage. For this reason temperature differences between different portions of the plastic material injected into a mold result in different shrinkages of the different parts, which renders accurate shaping difficult. Also, the material must be cooled in the mold to a temperature where it will be self-sustaining. When the material injected into the mold is quite fluid, a high degree of cooling is necessary. This slows up the molding cycle and at the same time is apt to result in chilling the outer part of the article more rapidly than the inner part and, after the outer surface of the article has set, the continued cooling and shrinkage of the inner portion may result in dimples or other imperfections in the surface of the article.

In the process described, the slug of prepared plastic is at a temperature where it will substantially maintain its shape against gravity and would only slowly sag if left on a flat support. The slug is preferably of slightly less diameter than the opening in sleeve 35 so that it will slide readily into the opening through mold half 32, with no resistance except the slight friction on the lower side.

In the apparatus shown, the slug is circular in cross-section and the injection cylinder and mold opening are similarly shaped, and rolling the slug down the chute helps maintain this shape. If desired for certain articles, or for other reasons, other shapes might be used. In such cases, the transfer means should be calculated to maintain the desired shape, or if there is sagging during transfer, the shape of the discharge nozzle and injection cylinder should be so related that the slug will fit the cylinder after sagging.

The force applied by plunger 36 is required only to expand the end of the slug into the cavity of the mold and make it fit the mold completely. In this way the plastic may be at a nearly self-sustaining temperature against gravity when it enters the mold and still require much less pressure per square inch by the injection plunger than in the ordinary injection molding device. The material as it enters the mold is of substantially uniform temperature, and so avoids much differential shrinkage, and it requires relatively little cooling in order to become completely self-sustaining against gravity and, therefore, the necessary cooling can be quickly accomplished and the molding cycle shortened without an excessive heat gradient between the exterior and the interior of the molded article.

In the usual practice of injection molding of thermoplastic materials described above, the nature of the heating of the material is such as to limit the cross-section of the material extruded and to limit the size of the article molded. The improved method described above, whereby the material is plasticated in an extruding device and formed into a mold charge or slug which is substantially uniform in temperature throughout, makes possible the molding of articles of much greater size without difficulty.

The material introduced into hopper 10 may be homogeneous, or suitable ingredients may be fed into the hopper in proper proportion and may be thoroughly mixed during the heating and extruding operation. For example, a plasticizer or other ingredient may be added to modify the character of the extruded materials, or a suitable batch may be mixed and plasticized and/or plasticated in the extruding device.

For example, cellulose acetate, dimethyl phthalate and diethyl phthalate have been introduced into the hopper in proportions of 14, 3 and 3, respectively, and mixed, heated, and extruded from apparatus like that shown, in a substantially self-sustaining column, cut off into successive mold charges and transferred and injected into molds in the manner described.

The facility with which relatively large articles can be made by the improved method, and the relatively small amount of cooling necessary before the article is discharged from the mold make the possible output of one injection molding device unusually high, so that one molding device forms the material plasticated in an extruder of considerable capacity, especially where the articles are large. However, if desired, an extruder may be constructed to furnish more material than can be handled by one molding device, especially where small articles are formed, and in such a case two or more molding devices may be arranged to receive slugs or mold charges from an extruder, the devices being timed to permit continuous extrusion and to take care of the charges as they are extruded. For production of uniform plastic material and to avoid difficulties with the apparatus, it is highly advantageous to maintain continuous extrusion. One simple arrangement is to provide two molding devices side by side, one to the left and the other to the right of the extruder, and tilt a portion of the receiving chute directly beneath the cut-off charges first to one side and then the other, to feed the molding devices alternately, but other suitable arrangements could be made to feed the charges in succession to two or more molding devices.

From the foregoing disclosure, one skilled in the art will be enabled to use the invention, not only in the exact form disclosed, but also in modifications within the scope of the appended claims.

What I claim is:

1. The method of molding material which can be rendered plastic by heat, which comprises heating the material to a plastic condition, extruding the heated material in a column, severing from the column a length containing sufficient material for a mold charge, transferring the charge to a position with one end presented to a mold inlet while maintaining the columnar form and plastic condition in which it was extruded, and forcing the material into the mold by pressure against the other end of the column while confining the column against spreading outside of the mold.

2. The method of molding material which can be rendered plastic by heat, which comprises heating the material to plastic condition, extruding the plastic material in a column, severing from the column a length containing enough material for a mold charge, transferring the severed charge to a position with its last-extruded end presented to a mold inlet while maintaining the columnar form and plastic condition in which it was extruded, and forcing the charge into the mold by pressure against its first-extruded end while confining the column against spreading outside of the mold.

3. The method of molding material which can be rendered plastic by heat, which comprises heating the material to a plastic condition, extruding the material in a column while it is plastic under pressure but substantially shape-retaining against gravity, severing from the column a length containing enough material to form a mold charge, transferring the severed charge to a position with one end inserted in a mold inlet having substantially the same shape and size as the cross-section of the column, while maintaining the columnar form and the plastic condition in which it was extruded, then forcing the charge into the mold by pressure against its other end while confining it against spreading outside of the mold.

4. A method in accordance with claim 3 and comprising extruding the column in circular cross-section and rolling the charge laterally over a supporting surface during the transfer.

5. In combination a mixing and extruding device having a circular discharge nozzle, means to sever a predetermined length from the end of a column of material extruded from said nozzle, an injection press comprising means providing a cylindrical opening slightly larger in cross-section than the opening in said nozzle and as long as said predetermined length, a mold with circular inlet opening of the same diameter as said cylindrical opening, means to present the mold inlet in line with and against one end of the cylindrical opening, means providing a surface over which a severed charge can roll after severance to a position in line with said cylindrical opening, a plunger, and means to move the plunger to drive an alined charge into said cylindrical opening and through said opening and mold inlet into the mold, whereby a stiffly plastic column of extruded material may be severed in a mold charge and conveyed to and into a mold without deformation except inside of the mold.

HENRY M. RICHARDSON.

REFERENCES CITED

The following references are of record in the file of this patent:

UNITED STATES PATENTS

| Number | Name | Date |
|---|---|---|
| 1,865,464 | Geyer | July 5, 1932 |
| 1,944,464 | Richardson | Jan. 23, 1934 |
| 1,997,074 | Novotny | Apr. 9, 1935 |
| 2,338,607 | Wacker | Jan. 4, 1944 |
| 2,398,318 | MacMillin et al. | Apr. 9, 1946 |

FOREIGN PATENTS

| Number | Country | Date |
|---|---|---|
| 427,885 | Great Britain | Apr. 30, 1935 |
| 516,398 | France | Apr. 18, 1921 |